_Patented Feb. 23, 1954_

2,670,333

UNITED STATES PATENT OFFICE

2,670,333

PROCESS FOR THE MANUFACTURE OF NEW POLYALKYLIDENES BY CONDENSATION OF DIAZOALKANES

Neil Hunter Ray, Northwich, England, assignor to Imperial Chemical Industries Limited, a corporation of Great Britain No Drawing. Application April 4, 1952, Serial No. 280,663

Claims priority, application Great Britain April 12, 1951

5 Claims. (Cl. 260—2)

This invention relates to new polymeric materials and more particularly to a process for the manufacture of branched chain hydrocarbons.

Polyalkylidenes represented by the general formula

where R is an alkyl group, and $n$ is an integer greater than 10 and generally between 50 and 10,000, as described in our co-pending application, Serial No. 189,293, are new products which vary from hard, fusible, inert and transparent glasses to substances of lower melting point which may even be liquids at room temperature. We have now found that flexible, rubbery or hard solids may be obtained from a mixture of diazomethane with a minor molecular proportion of a higher diazoalkane, in high yield, by allowing the mixture to react in presence of certain boron-containing catalysts in suitable conditions.

According to the present invention, we manufacture polyalkylidenes which are flexible, tough, branched chain hydrocarbons from a mixture of diazomethane and a minor molecular proportion, preferably between 1/10 and 20 mole percent, of one or more higher diazoalkanes in presence of a covalent boron compound as catalyst, preferably in presence of an organic solvent, at a temperature between 0° and 50° C.

Covalent boron compounds are volatile without decomposition, and include organo-boron compounds such as boric esters, methyl borane and other alkyl boranes, and boron halides such as boron trifluoride. Suitable amounts of catalyst are from ½ to 10 parts by weight per 100 parts of diazo compounds.

Suitable organic solvents include ether, benzene and dioxane, and the reaction is carried out in the substantially anhydrous condition in order to avoid loss of the diazo compounds.

The substances which we can react with diazomethane in this way include diazoethane, 1-diazopentane, 1-diazoheptane, 1-diazodecane, 1-diazooctadecane, and 1,6-bis diazohexane. The products can be represented by the formula:

$(CHR)_a$—$(CH_2)_b$—$(CHR)_c$—$(CH_2)_d$—etc.

where R is an alkyl group and $a$, $b$, $c$, and $d$ are integers.

In carrying out the reaction we prefer to dissolve the diazo compound in ether or another organic solvent at 0°–20° C., then add the catalyst in several small proportions until the yellow colour of the diazo compound disappears. When ether is being used as the reaction medium, the product is precipitated during this period. This generally takes up to an hour but depends on the amount and nature of the catalyst. The desired product is collected by filtration, unless it is soluble in the solvent used, in which case the solvent is distilled off. Yields are generally from 60–80% of the stoichiometric proportion of the diazo compounds, and higher yields can be obtained.

In the products which are obtained in presence of a covalent boron compound as catalyst the molecular weight exceeds 50,000 and is generally of the order of magnitude of 100,000. With these substances it is, however, not convenient to measure molecular weights and we prefer to employ intrinsic viscosity as a means of defining high molecular weight. By "intrinsic viscosity" we mean the limit as the concentration (C) tends to zero of the function

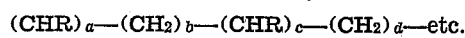

where $\eta_r$ is the relative viscosity, i. e. the viscosity of a solution of concentration C divided by the viscosity of the solvent. As this expression is only a ratio, no units are needed to define it. The products are at most partly crystalline, and with more than about 10 mole per cent of the higher diazoalkane they are virtually non-crystalline. They are mostly soluble in the hot in organic solvents such as carbon tetrachloride, benzene and other hydrocarbons, but insoluble in water, alcohol and ether. Those made from bis diazo compounds, however, are insoluble even in hot organic solvents. They are useful in mouldings and electrical insulation and particularly useful for the manufacture of tough flexible films by hot pressing, hot extrusion or other means. Being of high molecular weight, they can also be spun into fibres, and films and fibres of them can be cold drawn.

The invention is illustrated but not restricted by the following examples in which all parts are by weight.

Example 1

To a mixture of 30 parts of diazomethane and 4 parts of diazoethane dissolved in 1400 parts of dry ether was added 0.5 part of trimethyl orthoborate, and the mixture was allowed to stand at 20° C. for 24 hours. At the end of this time the product, which was precipitated, was separated by filtration, washed with ethanol and ether, and dried. It consisted of 7 parts of a rubbery polymer, soluble in hot benzene, chloroform and tetrahydronaphthalene, but insoluble in water, alcohols and ether. Its intrinsic viscosity measured in tetrahydronaphthalene at 75° C. was 3.5, indicating a molecular weight of about 100,000. Its X-ray diffraction pattern indicated that it possessed a very low order of crystallinity; on stretching or cold-drawing, however, it showed a much greater degree of crystallinity, with reflections corresponding roughly with those found in polythene. Its infra-red absorption spectrum showed that it contained 10.5 methyl groups per 100 carbon atoms, and analysis showed that it contained 85.7% carbon and 14.3% hydrogen. On heating in an atmosphere of nitrogen it softened at 230° C. and at this temperature it was pressed out into a perfectly transparent, tough, flexible and elastic film. On further heating it melted, with some degradation, at 370° C.

*Example 2*

To 6 parts of diazomethane and 2.5 parts of diazododecane dissolved in 700 parts of dry ether was added 0.5 part of trimethyl orthoborate, and the mixture was left to stand at 20° C. for 24 hours. The resulting precipitate was collected, washed and dried as in Example 1. This product was 2 parts of a rubbery polymer having very similar properties to those of the previous example: i. e. molecular weight about 100,000, softening point (in nitrogen) 250° C., melting point (with some decomposition) 370° C. It was soluble in chloroform and benzene, but not in alcohol or ether. Analysis agreed with the formula $C_nH_{2n}$.

*Example 3*

To 6 parts of diazomethane and 1 part of 1-diazohexane dissolved in 500 parts of dry ether was added 0.1 part of triphenyl orthoborate and the mixture left to stand at 20° C. for 24 hours. The resulting precipitate was collected, washed with ether and dried. It consisted of 2 parts of an elastomer, soluble in cold chloroform but not in alcohol; it was about 50% crystalline and its intrinsic viscosity was 2.4.

*Example 4*

To 13 parts of diazomethane and 1 part of 1,6-bis diazohexane in 900 parts of ether was added 0.2 part of tri-($\beta$-chloroethyl)-orthoborate. After one hour at 20° C. the resulting precipitate was collected, washed and dried as usual. It comprised 5 parts of a tough, flexible polymer, insoluble in all solvents, but softening under pressure at 180° C. sufficiently to be pressed into a thin film, which was transparent and flexible.

*Example 5*

To 6 parts of diazomethane and 2.5 parts of diazododecane dissolved in 700 parts of dry ether was added 0.5 part of tricyclohexyl orthoborate, and the mixture was left to stand at 20° C. for 24 hours. The resulting precipitate was collected, washed and dried as in Example 1. This product was 2 parts of a rubbery polymer having very similar properties to that of Example 1: i. e. molecular weight about 100,000, softening point (in nitrogen) 250° C., melting point (with some decomposition) 370° C. It was soluble in chloroform and benzene, but not in alcohol or ether. Analysis agreed with the formula $C_nH_{2n}$.

What we claim is:

1. Process for the manufacture of flexible, tough, high molecular weight, branched chain hydrocarbons which comprises condensing diazomethane and a minor molecular proportion of at least one higher diazoalkane in presence of an ester of boric acid as catalyst.

2. Process as claimed in claim 1 carried out in presence of anhydrous ether.

3. Process as claimed in claim 1 carried out at a temperature of from 0° C. to 50° C., and in the presence of anhydrous ether.

4. Process as claimed in claim 3, carried out at a temperature of from 0° C. to 20° C.

5. Process as claimed in claim 1 in which the reaction mixture contains between 0.1 and 20 moles of higher diazoalkane per 100 moles of diazomethane, and from 0.5 to 10 parts by weight of an ester of boric acid per 100 parts by weight of diazo compounds.

NEIL HUNTER RAY.

References Cited in the file of this patent

Meerwein: Angew Chem., A60, No. 3, page 78 (March 1948).